United States Patent [19]

Nakamura et al.

[11] Patent Number: 5,444,319
[45] Date of Patent: Aug. 22, 1995

[54] SQUIRREL-CAGE ROTOR FOR HIGH-SPEED INDUCTION MOTOR

[75] Inventors: Kosei Nakamura, Minamitsuru; Yoshiyuki Hayashi, Sunto; Masami Kimijima; Yohei Arimatsu, both of Minamitsuru, all of Japan

[73] Assignee: Fanuc Ltd., Yamanashi, Japan

[21] Appl. No.: 232,159

[22] Filed: May 16, 1994

[30] Foreign Application Priority Data

Sep. 17, 1992 [JP] Japan .................. 4-247906

[51] Int. Cl.$^6$ ......................................... H02K 17/16
[52] U.S. Cl. ........................................ 310/211; 310/42; 310/45; 310/201; 310/261; 310/270; 29/598
[58] Field of Search ............ 310/198, 211, 212, 261, 310/262, 42, 270, 166, 260, 208; 29/598

[56] References Cited

U.S. PATENT DOCUMENTS

| | | | |
|---|---|---|---|
| 1,823,337 | 9/1931 | Sheely | 310/211 |
| 2,196,059 | 4/1940 | Cox . | |
| 3,936,685 | 2/1976 | Glockner et al. | 310/211 |
| 4,309,635 | 1/1982 | Sei et al. | 310/42 |
| 5,341,058 | 8/1994 | Kohler et al. | 310/211 |

FOREIGN PATENT DOCUMENTS 0341317 11/1989 European Pat. Off. .
57-149677 9/1982 Japan .
1-134973 9/1989 Japan .

*Primary Examiner*—R. Skudy
*Attorney, Agent, or Firm*—Nikaido, Marmelstein, Murray & Oram

[57] ABSTRACT

A squirrel-cage rotor (10) includes a laminated core (14) fixed to a rotor shaft (12), a plurality of secondary conductors (18) arranged respectively in a plurality of through holes (16) formed through the laminated core (14), a pair of end rings (20) connected to the secondary conductors (18) at axial ends of the laminated core (14), and a pair of reinforcing members (22, 23) respectively covering the end rings (20). The secondary conductors (18) and the end rings (20) are integrally formed through a casting process, and are connected with the laminated core (14) and the reinforcing members (22, 23). Each reinforcing member (22, 23) is formed as an annular element of high-rigidity material, and includes a cylindrical wall (26, 27) surrounding the cylindrical outer surface of the end ring (20), a multi-aperture wall (28, 29) provided with a plurality of apertures (32) which communicate respectively with the through holes (16) of the laminated core (14) and held between the end ring (20) and the laminated core (14), and an end wall (30, 31) brought into contact with the axial outer surface of the end ring (20).

4 Claims, 3 Drawing Sheets

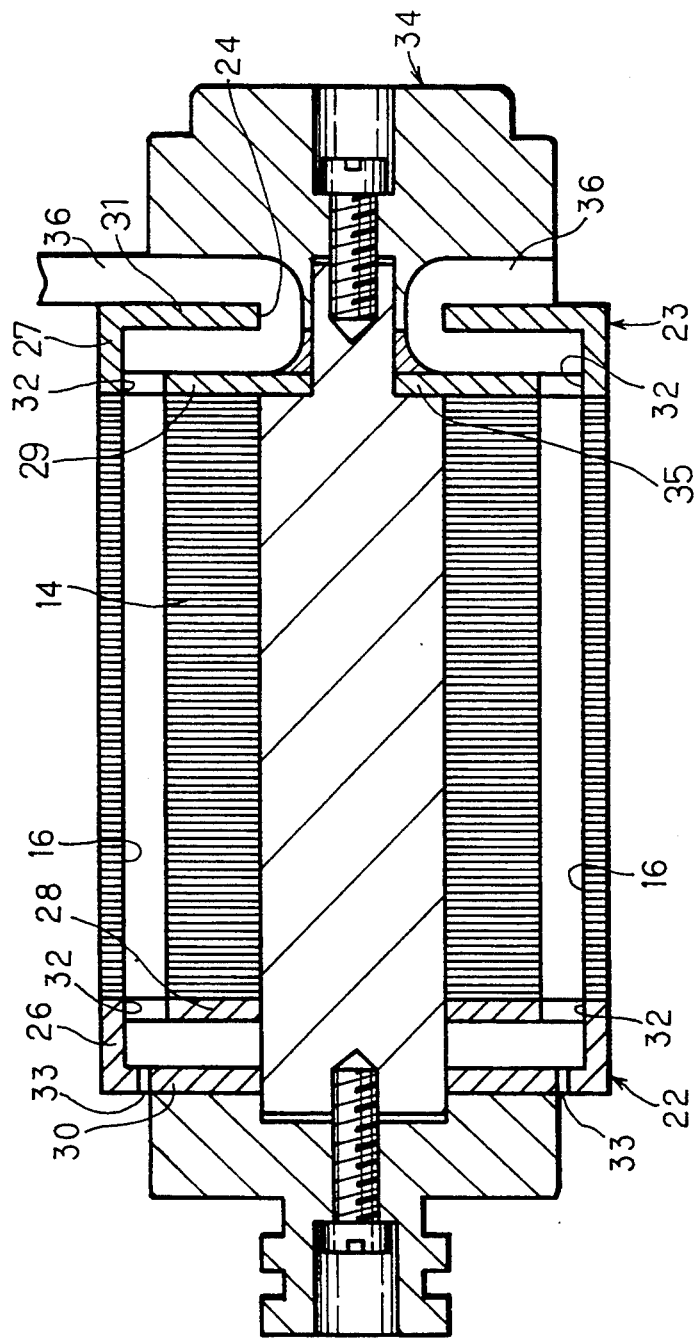

SQUIRREL-CAGE ROTOR FOR HIGH-SPEED INDUCTION MOTOR

TECHNICAL FIELD

The present invention relates to a squirrel-cage rotor for an induction motor, and more particularly to a squirrel-cage rotor for a high-speed induction motor which includes reinforcing members for preventing cast end rings from being deformed during high-speed rotation.

BACKGROUND ART

Recently, in order to enhance the performance of a machine tool, a spindle motor for driving a spindle has been improved in the speed and power thereof. Some induction motors, commonly used as spindle motors, have squirrel-cage rotors which include secondary conductors and end rings both integrally formed with a laminated core by a casting process. When the speed of an induction motor having such a squirrel-cage rotor must be increased, there is a fear that end rings arranged at axial ends of a laminated core are bent or broken due to the centrifugal force caused by high-speed rotation. A known squirrel-cage rotor adaptable to high-speed rotation includes separate reinforcing members formed of high-rigidity materials, such as iron or stainless steel, the reinforcing members being fixedly disposed on the rotor while surrounding the end rings, so as to eliminate the deformation of the end rings.

Conventional reinforcing members for the end rings of a high-speed squirrel-cage rotor are formed as annular elements, each of which has a generally L-shaped cross-section at a circumferential region and includes a cylindrical wall coming into contact with the cylindrical outer circumferential surface of the end ring and an end wall coming into contact with the axial end surface of the end ring. The reinforcing member covers the surface of the end ring, and the end wall thereof is usually fixed to the axial end surface of the end ring by fixing means such as bolts. Therefore, the deformation of the end ring due to centrifugal force is prevented by the cylindrical wall of the reinforcing member. In the conventional reinforcing member, however, the cylindrical wall is supported through the end wall on the end ring in a cantilever manner, which causes problems that the cylindrical wall tends in itself to be bent outward due to centrifugal force in response to the increase of the diameter of the rotor or the rotation speed thereof, and thus fails to support the end ring.

DISCLOSURE OF THE INVENTION

The object of the present invention is to provide a squirrel-cage rotor which can prevent cast end rings from being deformed or broken due to centrifugal force even when the rotor rotates at extreme high speed, e.g., tens of thousands rpm, and thus makes it possible to produce a high-speed induction motor with excellent reliability.

To accomplish the above object, the present invention provides a squirrel-cage rotor for a high-speed induction motor, comprising a rotor shaft; a laminated core made by stacking magnetic laminations, the laminated core being provided with a plurality of through holes extended between axial ends of stacked laminations, and being fixed to the rotor shaft; a conductor section integrally formed through a casting process, the conductor section including a plurality of secondary conductors arranged respectively in the through holes of the laminated core and a pair of end rings connected at axial ends of the laminated core to the secondary conductors; and a pair of reinforcing members respectively covering the end rings, each reinforcing member including a cylindrical wall for surrounding a cylindrical outer surface of each end ring, a multi-aperture wall provided with a plurality of apertures which communicate respectively with the through holes of the laminated core and extending in a radial inward direction from one edge of the cylindrical wall so as to be held between the end ring and an axial end face of the laminated core, and an end wall extending in a radial inward direction from the other edge of the cylindrical wall so as to come into contact with an axial outer surface of the end ring at a side opposite to the multi-aperture wall.

In this squirrel-cage rotor, the secondary conductors and the end rings of the conductor section may be integrally formed through a die-casting process from aluminum. Also, it is preferred that one of the reinforcing members is provided at the end wall with a plurality of pores for acting as air vents in a casting process.

The reinforcing members are disposed at the axial ends of the laminated core, and the multi-aperture walls of the reinforcing members are brought into contact with the axial end faces of the laminated core in such a manner that the apertures thereof are respectively communicated with the through holes of the laminated core. In this state, the laminated core and the reinforcing members are fixed on a jig, and a casting process is carried out. In this respect, a gate is provided at the opening of the inner diameter portion of the reinforcing member. When casting the conductor section in this manner, the reinforcing members are fixedly held by the laminated core and the conductor section, and the cylindrical walls of the reinforcing members are firmly supported at both ends thereof through the multi-aperture walls and the end walls. Therefore, the reinforcing members prevent the end rings from being deformed or broken due to centrifugal force, without causing deformation of the reinforcing members, even when the rotor rotates at an extremely high speed such as tens of thousands of rpm.

BRIEF DESCRIPTION OF THE DRAWINGS

The foregoing and the other objects, features, and advantages of the present invention will be described with relation to the embodiments shown in the accompanying drawings, in which;

FIG. 3 is a sectional view for describing the process of making the squirrel-cage rotor shown in FIG. 1.

BEST MODE OF CARRYING OUT THE INVENTION

Figure 1:
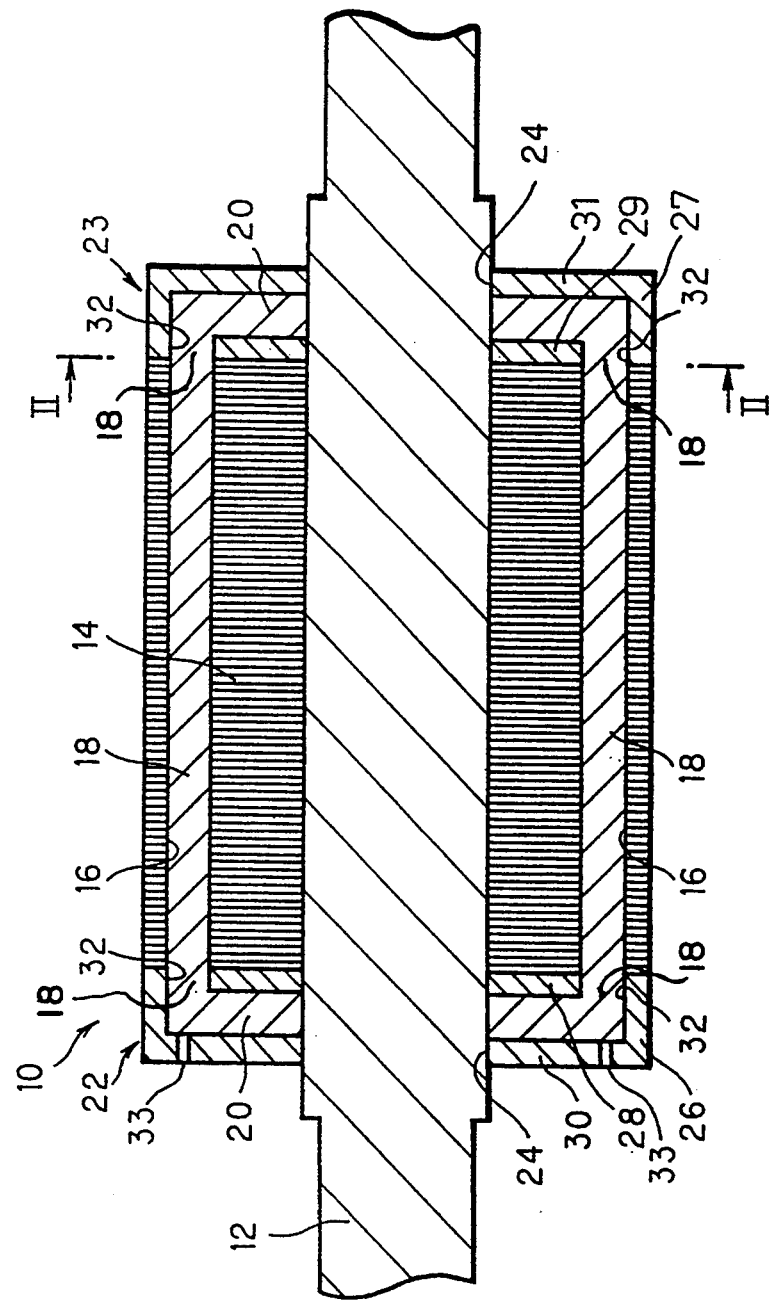
FIG. 1 is a sectional view of a squirrel-cage rotor according to the embodiment of the present invention.

Referring to the drawings, FIG. 1 shows a squirrel-cage rotor 10 of a high-speed induction motor, according to the embodiment of the present invention. The squirrel-cage rotor 10 includes a rotor shaft 12, a laminated core 14 made by stacking magnetic laminations, such as silicon steel plate, and fixed to the rotor shaft 12, a plurality of secondary conductors 18 arranged respectively in a plurality of through holes 16 formed adjacent to the outer circumference of the laminated core 14 and axially passing through the core, a pair of end rings 20 arranged at axial ends of the laminated core 14 and connecting the secondary conductors 18 to one another, and a pair of reinforcing members 22, 23 respectively covering the end rings 20 and fixed to the end rings 20. The secondary conductors 18 and the end rings 20 are integrally formed through a casting process, such as a die casting of aluminum, whereby the laminated core 14 and the reinforcing members 22, 23 are integrally connected to each other by secondary conductors 18 and end rings 20. The secondary conductors 18 may be skewed relative to an axis as being well known, to reduce a torque ripple when an electric motor operates.

Figure 2:
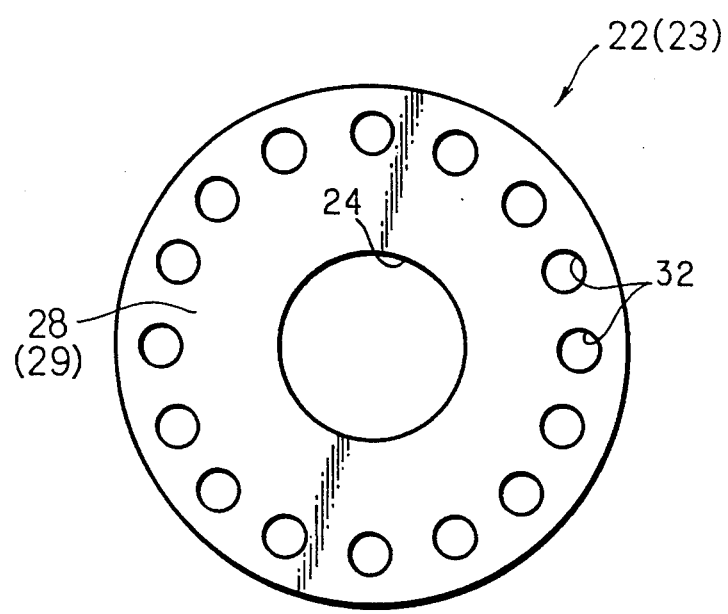
FIG. 2 is an end view of a reinforcing member shown along line II—II of FIG. 1.

The reinforcing members 22, 23 are formed as annular elements, each of which has a generally U-shaped cross-section at a circumferential region which U-shaped cross section opens at an inner diameter portion 24 thereof in a radial inward direction. The reinforcing members are made from a high-rigidity material, such as iron or stainless steel, through, e.g., a machining process. The reinforcing members 22, 23 are formed to include cylindrical peripheral walls 26, 27 having an outer diameter generally the same as that of the laminated core 14, and annular inner multi-aperture walls 28, 29 and annular inner end walls 30, 31, which extend in a radially inward direction from the axial edges of the cylindrical walls 26, 27, respectively. The multi-aperture inner walls 28, 29 are provided with a plurality of axial apertures 32 (see FIG. 2) formed to respectively align with and communicate with the through holes 16 of the laminated core 14 when disposed coaxially thereto as described below. When the end rings 20 are formed in the annular cavities defined by those walls through the casting process mentioned below, the peripheral cylindrical walls 26, 27 of the reinforcing members 22, 23 cover the outer circumferential surfaces of the end rings 20, the multi-aperture walls 28, 29 are held between the axial end faces of the laminated core 14 and the end rings 20, and the end walls 30, 31 come into contact with the axial outer end surfaces of the end rings 20. One reinforcing member 22 may be provided with air vents 33 at the portions of the end wall 30 opposite to the apertures 32, for stabilizing the flow of molten metal in the casting process.

The process of making the squirrel-cage rotor 10 having above-mentioned structure is described below with reference to FIG. 3. First, the reinforcing members 22, 23 are disposed coaxially to the laminated core 14 in a state where the multi-aperture walls 28, 29 thereof are in contact with the axial end faces of the laminated core 14. At this time, the multi-aperture walls 28, 29 are brought into contact with the end faces of the laminated core 14 in such a manner that the apertures 32 thereof are respectively communicated with the through holes 16 of the laminated core 14 to form a passageway for secondary conductors 18. In this state, the laminated core 14 and the reinforcing members 22, 23 are fixed on a jig 34 shown in FIG. 3, and casting process is carried out. In this respect, the reinforcing member 23 is provided with an inner diameter portion of the multi-aperture wall 29 thereof, which is extended beyond the inner circumferential surface of the laminated core 14 in a radial inward direction, so as to make it possible for the jig 34 to hold the laminated core 14 between the reinforcing members 22, 23 under desired pressure. This extended portion 35 is cut off after casting process is completed. As illustrated, a gate 36 is provided at the opening of the inner diameter portion 24 of the reinforcing member 23.

When the casting process is carried out in this manner, molten metal, such as molten aluminum, flows into the annular cavity of the reinforcing member 23 provided with the gate 36, and then into the through holes 16 of the laminated core 14 through the apertures 32, thereby integrally forming a plurality of secondary conductors 18 and a pair of end rings 20. After casting, the jig 34 is removed, and the cast piece protruding inward from the inner circumferential surface of the laminated core 14 and the extended portion 35 of the multi-aperture wall 29 of the reinforcing member 23 are cut off. The laminated core 14 and the reinforcing members 22, 23, which are integrally connected through the casting process for forming the secondary conductors 18 and the end rings 20 in this manner, are fixed to the rotor shaft 12 (FIG. 1) by, e.g., shrink fitting, whereby the squirrel-cage rotor 10 shown in FIG. 1 is produced.

As mentioned above, when the secondary conductors 18 and the end rings 20 are cast in the squirrel-cage rotor 10, the laminated core 14 formed by stacking magnetic laminations can be integrally fastened, and the reinforcing members 22, 23 can be integrally and firmly held by the laminated core 14 and the end rings 20. At this time, the cylindrical walls 26, 27 of the reinforcing members 22, 23 are firmly supported at both ends thereof through the multi-aperture walls 28, 29 and the end walls 30, 31. Therefore, the reinforcing members 22, 23 can prevent the end rings 20 from being deformed or broken due to centrifugal force, without causing the deformation of the reinforcing members, even when the rotor rotates at an extremely high speed, e.g., tens of thousands of rpm.

INDUSTRIAL APPLICABILITY

According to the present invention, the cylindrical walls of the reinforcing members, which cover the outer circumferences of the end rings, are firmly supported at both ends thereof through the multi-aperture walls and the end walls on the laminated core and the end rings. Whereby, the reinforcing members can prevent the end rings from being deformed or broken due to centrifugal force, without causing the deformation of the reinforcing members, even when the rotor rotates at an extremely high speed, e.g., tens of thousands of rpm. Therefore, it is made possible to produce a high-speed induction motor with excellent structural reliability, by using the squirrel-cage rotor of the present invention.

We claim:

1. A squirrel-cage rotor for a high-speed induction motor, comprising:
   a rotor shaft
   a laminated core composed of stacked magnetic laminations and provided with a plurality of through holes spaced peripherally and extending axially between axial ends of said stacked magnetic laminations, said core being fixed to said rotor shaft;
   a pair of reinforcing members each formed as a unitary annular element of generally U-shaped axial cross-section at a circumferential region, said members each having an open inner portion in a radially inward direction formed by an outer cylindrical wall having an outer diameter generally the same as that of said laminated core, an annular end wall which extends in a radially inward direction from an axial outer edge of said outer cylindrical wall, and an annular inner wall radially extending from an axially inner edge and provided with a plurality of axially extending apertures positioned radially inward of said outer cylindrical wall and spaced peripherally corresponding to respective ones of said laminated core plurality of axial through holes, each of said reinforcing members being positioned in contact with an end of said laminated core with said apertures positioned to communicate respectively with said through holes; and a conductor section integrally formed in said laminated core and reinforcing members, including, a plurality of secondary conductors extending through said laminated core plurality of through holes and through said reinforcing members corresponding plurality of apertures, and an end ring connecting said secondary conductors formed in said open inner portion of each of said reinforcing members such that said conductor section integrally connects said laminated core and reinforcing members together, said reinforcing members preventing said end rings from being deformed due to centrifugal force.

2. A squirrel-cage rotor as set forth in claim 1, wherein said secondary conductors and said end rings of said conductor section are integrally formed, through a die-casting process, from aluminum.

3. A squirrel-cage rotor as set forth in claim 2, wherein one of said reinforcing members is provided at said end wall with a plurality of pores for acting as air vents in said annular casting process.

4. A squirrel - cage motor as set forth in claim 1, wherein said reinforcing members preventing said end rings from being broken due to centrifugal force.

* * * * *